US008855922B1

(12) United States Patent
Starenky et al.

(10) Patent No.: US 8,855,922 B1
(45) Date of Patent: Oct. 7, 2014

(54) MANAGING USE OF LOCATION-IDENTIFICATION SERVICES

(71) Applicant: Google Inc., Mountain View, CA (US)

(72) Inventors: Victor Starenky, Waterloo (CA); Alex Kennberg, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/044,830

(22) Filed: Oct. 2, 2013

Related U.S. Application Data

(63) Continuation of application No. 12/702,311, filed on Feb. 9, 2010, now Pat. No. 8,566,022.

(51) Int. Cl.
| | | |
|---|---|---|
| *G06F 19/00* | (2011.01) | |
| *H04W 4/02* | (2009.01) | |
| *G01C 21/20* | (2006.01) | |
| *H01M 2/18* | (2006.01) | |
| *G01S 5/02* | (2010.01) | |

(52) U.S. Cl.
CPC ............... H04W 4/02 (2013.01); *G01C 21/20* (2013.01); *Y02E 60/12* (2013.01); *H01M 2/18* (2013.01); *G01S 5/0252* (2013.01)
USPC ............. 701/410; 455/404.2; 455/456.1; 455/456.5; 429/143; 429/147; 342/357.25; 342/387; 342/394; 340/988; 370/338

(58) Field of Classification Search
CPC ......... H04W 4/02; G01C 21/00; Y02E 60/12; H01M 2/18; G01S 5/0252
USPC ................. 701/410; 455/404.2, 456.1, 456.5; 429/143, 147; 342/357.25, 387, 394; 340/998; 370/338
See application file for complete search history.

(56) References Cited

U.S. PATENT DOCUMENTS

| | | | |
|---|---|---|---|
| 7,299,007 B2 | 11/2007 | Eskin | |
| 7,593,738 B2 | 9/2009 | Anderson | |
| 7,920,871 B2 | 4/2011 | Okuda | |
| 8,032,153 B2 | 10/2011 | Dupray et al. | |
| 8,140,092 B2 | 3/2012 | Mia et al. | |
| 8,406,162 B2 * | 3/2013 | Haupt et al. | 370/311 |
| 8,566,022 B1 * | 10/2013 | Starenky et al. | 701/410 |
| 2008/0233973 A1 | 9/2008 | Gfeller et al. | |

(Continued)

OTHER PUBLICATIONS

'GPS and Nikon: Managing Power' [online]. Promote Systems Blog, May 21, 2009, [retrieved on Mar. 22, 2010]. Retrieved from the internet: http:blog.promotesystems.com/61/managing-camera-gps-power/.

(Continued)

*Primary Examiner* — McDieunel Marc
(74) *Attorney, Agent, or Firm* — Bracewell & Giuliani LLP

(57) ABSTRACT

In general, the subject matter described in this specification can be embodied in methods, systems, and program products for identifying a location of a mobile computing device. A first location estimate of a mobile computing device and an accuracy of the first location estimate is determined at a mobile computing device based on wireless signals received from one or more beacons. A time period based on the accuracy of the first location estimate is determined. One or more subsequent location estimates of the mobile computing device and respective accuracies are determined. The determination of the subsequent location estimates is stopped at an end of the time period. A preferred location estimate from the determined location estimates is determined at the mobile computing device.

21 Claims, 5 Drawing Sheets

(56) References Cited

U.S. PATENT DOCUMENTS

| | | |
|---|---|---|
| 2009/0316671 A1* | 12/2009 | Rolf et al. .................... 370/338 |
| 2010/0125409 A1 | 5/2010 | Prehofer |
| 2010/0203902 A1 | 8/2010 | Wachter et al. |
| 2010/0324813 A1 | 12/2010 | Sundararajan et al. |
| 2011/0009132 A1 | 1/2011 | Skarby et al. |
| 2011/0225151 A1* | 9/2011 | Annambhotla et al. ...... 707/724 |

OTHER PUBLICATIONS

'Foursquare (service)' [online], Wikipedia, Jan. 20, 2010, [retrieved on Jan. 20, 2010]. Retrieved from the internet: http://en.wikipedia.org/wiki/Foursquare_(service).

* cited by examiner

# MANAGING USE OF LOCATION-IDENTIFICATION SERVICES

PRIORITY CLAIM

This application is a continuation of Ser. No. 12/702,311 filed on Feb. 9, 2010, entitled "Managing Use of Location-Identification Services", the disclosure of which is hereby incorporated by reference in its entirety.

BACKGROUND

The present disclosure generally relates to location-identification services. Mobile computing devices such as cellular telephones, laptop computers, and netbooks can determine location-identification information (e.g., an estimated location of the device and an accuracy of the estimation). The location and a corresponding accuracy may be determined using a location-identification service. Example location-identification services include satellite-based location-identification systems (e.g., Global Positioning System), a use of cellular identification (identification of cellular telephone base station towers using cellular tower identification symbols that are transmitted in signals from the base stations), and identification of Wi-Fi signal sources. To identify a location with a corresponding high accuracy, computing devices may request a continuing stream of location and accuracy determinations. Such a continuing use of the location-identification service may involve high power consumption, potentially draining a battery of the mobile computing device.

SUMMARY

This document describes techniques, methods, systems, and mechanisms for managing location-identification services. In general, a mobile computing device can vary the length of time that a location-identification service (e.g., GPS) is used based on an accuracy of an initial location reading. If the initial location reading is fairly accurate, an indication of the initial location can be displayed on the mobile device and a limited number of subsequent locations can be read in an effort to determine a location reading with a better accuracy. However, if the initial reading is not very accurate, the mobile device may not display the initial location, and a greater number of subsequent locations may be read than if the initial location reading was fairly accurate. Upon no longer determining the device's location, the most accurate location can be displayed on the computing device, potentially over-writing a display of the initial location.

More specifically, application programs executing on mobile computing devices (e.g., a smart or application program telephone) can request that a location-identification component of the mobile computing device provide a current device location to the application program. For example, a micro-blogging application program may allow a user of the mobile device to submit relatively short textual posts to a group of people that are associated with the user (e.g., people that have agreed to "follow" the user's posts online). Each post may be accompanied with a location of the user. Thus, the micro-blogging application program may request, from the location-identification component, a location of the mobile telephone. In response to the micro-blogging application program's request, the location-identification component may invoke a single location reading using GPS hardware and return an initial location and accuracy of the initial location to the application program.

The application program may request subsequent determinations of the mobile telephone's location in an effort to identify, for use by the application program, a location with an even better accuracy. Thus, the application program may request that the location-identification component perform repeated location readings over a period of time. The application program can vary a length of the period depending on the accuracy of the initial location reading. For example, if the accuracy of the initial location reading is above a threshold value (e.g., 50 meters), location readings may occur for a short period of time (e.g., 3 more times over 5 seconds). If the accuracy of the initial location reading is below a threshold value, location readings may occur for a longer period of time (e.g., 9 more times over 15 seconds). The length of the period of times can be preset or calculated based on the accuracy of the initial location. An accuracy being above or below a threshold value can mean that the accuracy is better or worse than the threshold value, respectively, even though an associated accuracy "number" may not actually be greater than or less than a threshold value "number."

Also, if the accuracy of the initial location reading is above the threshold value, the application program may present for display on the mobile telephone the initial location reading, or may use the initial location reading for operations other than determining whether subsequent readings should be performed. The mobile telephone may display the initial location before any of the subsequent location readings are performed, or potentially after some of the subsequent location readings are performed, but before all of the subsequent locations readings have been performed. Similarly, the initial location may not display on the mobile telephone, but may be used by the application program as an accepted location of the mobile telephone. For example, if the initial location's accuracy was high and the user submitted a post to his micro-blog, the initial location may be transmitted to the subscribers with the post, even though the initial location may not have displayed to the user. Conversely, if the accuracy of the initial location reading was below the threshold value, the application program may not cause the initial location reading on the mobile telephone to be displayed or used. The application program may await a determination of a preferred location.

Upon reading all of the locations during the time interval (where the time interval depends on the accuracy of the initial location reading), a reading with the greatest accuracy may be selected. For example, if the first location reading had an accuracy of 50 m, and the subsequent location readings had accuracies of 30 m, 60 m, 80 m, and 15 m, the location reading with an accuracy of 15 m may be selected as the most accurate location reading. In some examples, the first reading may be selected as the most accurate location reading. The most accurate location reading may be displayed on the mobile telephone and stored for use in the application program. The other location readings may be discarded or otherwise not used by the application program.

In some examples, if a subsequent location reading exceeds an early termination threshold (which may be associated with an accuracy that is more accurate than the accuracy threshold), the corresponding location may be deemed particularly accurate and the mobile computing device may no longer perform additional location identification requests. In other words, a time period for performing additional location determinations may be cut short if a particularly accurate location reading is received during the time period. In some examples, the initial location reading may surpass the early termination threshold and no subsequent location readings may be performed.

In various examples, a delay between each location reading is instituted to allow location readings to be performed over a period of time without unduly draining the device battery with adjoining location readings. In some examples, determining a number of times to obtain repeated location readings is the same as determining a time period over which to obtain the readings.

In general, one aspect of the subject matter described in this specification can be embodied in a computer-implemented method for identifying a location of a mobile computing device. A first location estimate of a mobile computing device and an accuracy of the first location estimate is determined at a mobile computing device based on wireless signals received from one or more beacons. A time period based on the accuracy of the first location estimate is determined. One or more subsequent location estimates of the mobile computing device and respective accuracies are determined. The determination of the subsequent location estimates is stopped at an end of the time period. A preferred location estimate from the determined location estimates is determined at the mobile computing device.

Another aspect of the subject matter described in this specification can be embodied in a computer program product, tangibly stored on a computer-readable storage medium, for identifying a location of a mobile computing device, the product comprising computer program instructions operable to cause a processor to perform operations. The operations include determining, based on wireless signals received from one or more beacons, a first location estimate of the mobile computing device and an accuracy of the first location estimate. The operations include selecting a time period based on the accuracy of the first location estimate, wherein a long time is selected if the accuracy is below a threshold accuracy value, and a short time period is selected if the accuracy is above the threshold accuracy value. The operations include presenting, if the short time period is selected but not if the long time period is selected, the first location estimate for display on the mobile computing device. The operations include repeatedly determining subsequent location estimates of the mobile computing device and respective accuracies of the subsequent location estimates for a duration of the time period, and ceasing to determine subsequent location estimates of the mobile computing device upon an expiration of the time period. The operations include determining a most accurate of the determined location estimates. The operations include presenting for display on the mobile computing device a most accurate of the determined location estimates.

In yet another aspect, the subject matter described in this specification can be embodied in a mobile computing device. The mobile computing device includes a display device. The mobile computing device includes a location-identifying unit to (i) determine an initial location estimate of the mobile computing device and a respective accuracy of the initially determined location estimate, and (ii) repeatedly determine, during a determined time period, one or more subsequent location estimates of the mobile computing device and respective accuracies of the subsequent location estimates, the time period determined based on the accuracy of the initial determined location estimate. The mobile computing device includes a timer to maintain the location-identifying unit in a mode of repeatedly determining subsequent location estimates until the determined time period expires. The mobile computing device includes a preferred location estimate determination unit determine a preferred location estimate from the initial location estimate and the one or more subsequent location estimates that are determined during the time period. The mobile computing device includes a means for presenting, with the display device, the initial location estimate during the determination of subsequent location estimates if the initial location estimate has a high accuracy, and for presenting the preferred location estimate after the time period expires.

These and other implementations can optionally include one or more of the following features. The one or more beacons may include one or more satellites of a space-based location identification system. The time period may be determined as one of a short time period and a long time period, wherein the long time period may be selected if the accuracy of the first location estimate is below a threshold accuracy value, and the short time period may be selected if the accuracy of the first location estimate is above the threshold accuracy value. An indication of the first location estimate may be presented for display on the mobile computing device if the determined time period is the short time period. The indication of the first location estimate may be presented for display prior to the determination of a subsequent location estimate. The indication of the first location estimate may not be presented for display on the mobile computing device prior to the stopping to determine subsequent location estimates if the determined time period is the long time period. The preferred location estimate may be presented for display on the mobile computing device after the stopping the determination of the subsequent location estimates. The preferred location estimate may be presented for display on the mobile computing device after the stopping and not prior to the stopping. Determining a time period may include determining a number of times to determine subsequent location estimates. The determined preferred location estimate may be the same as the first location estimate. Each location estimate and corresponding accuracy may be provided to an application program executing on the mobile computing device in a stream of individual location estimates and corresponding accuracies. 11. The application program may request each determination of location estimate and corresponding accuracy. The stopping may be in response to the application program either (i) ceasing to request an additional location estimate and corresponding accuracy or (ii) transmitting a request that the mobile computing device cease to continue to determine location estimates and accuracies. The preferred location estimate may be a most accurate of the initial and subsequent location estimates. The determination of the subsequent location estimates may be stopped before the end of the time period if an accuracy of a subsequently determined location estimate is greater than an early termination threshold accuracy value.

The one or more beacons may include base station transmitting antennas. Determining the first location estimate of the mobile computing device may include: (i) receiving from a base station transmitting antenna a portion of information that identifies the base station transmitting antenna, and (ii) determining a location estimate that is associated with the transmitting antenna. If the short time period is selected, the first location estimate may be presented for display on the mobile computing device prior to the continuing to determine subsequent location estimates of the mobile computing device. If the long time period is selected, the first location estimate may not be presented for display on the mobile computing device prior to ceasing to determine subsequent location estimates. The presented first location estimate and the presented most accurate location estimate may be the same. The timer may select either a short time period or a long time period based on the accuracy of the initial location estimate. The long time may be selected if the accuracy of the initial determined location corresponds to an accuracy that is below a threshold accuracy value and the short time period may be selected if the accuracy of the initial determined location corresponds to an accuracy that is above the threshold accuracy value.

Particular embodiments can be implemented, in certain instances, to realize one or more of the following advantages. Power use on a mobile computing device may be minimized while increasing an accuracy of a location that is used by the mobile computing device or an application program on the mobile computing device. A user may be provided with an early indication of a location of the mobile device if the location is highly accurate. If the location is not highly accurate, the user may not be provided the location during attempts to retrieve a more accurate location. Thus, a location that is displayed or used by the application program is less likely to change significantly, because the location may only be displayed or used if an initial threshold of accuracy is met.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
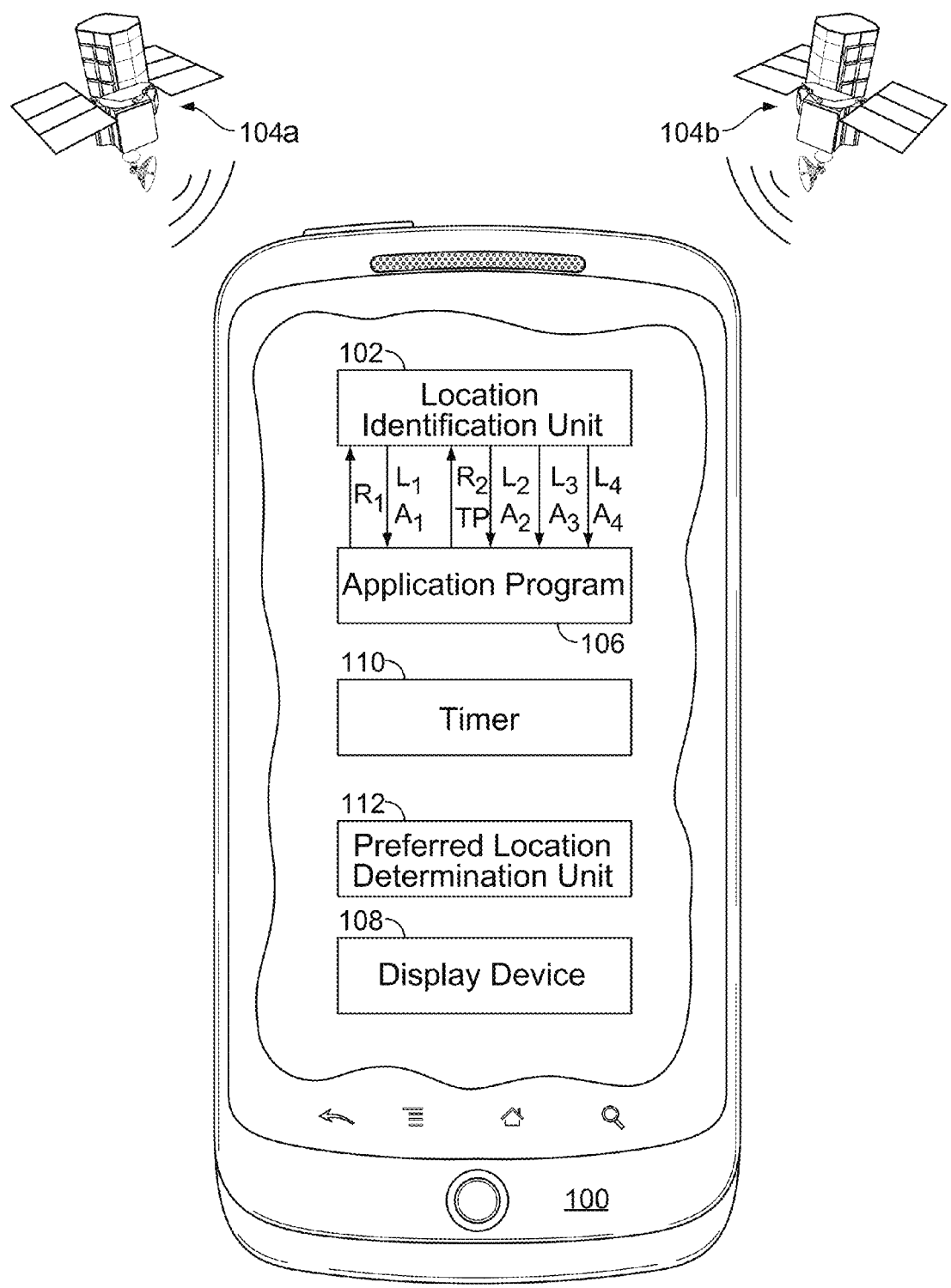
FIG. 1 is an illustration of a mobile computing device that uses wireless signals to determine an estimated location of the mobile computing device.

This document generally describes managing use of location-identification services. Mobile computing devices can use wireless signals, such as Global Positioning System (GPS) signals, Wi-Fi signals, or cellular tower signals, to determine an estimated location of the mobile computing device for presentation of the location to a user, or for use by location-reliant application programs that operate on the mobile computing device. For example, location identifying hardware can receive signals from multiple GPS satellites and location-identifying software can determine approximate latitude and longitude coordinates of the mobile computing device based on estimated differences in time for each signal to reach the mobile computing device. The mobile computing device can determine an accuracy measurement as a radial distance from the estimated location, where an actual location of the mobile device is computed to be within a circle—with a center at the estimated location and having the radial distance—with a predetermined probability (e.g., a 90%, 95% or 99% probability).

For example, an application program on the mobile computing device can receive from the location identifying software an estimated geographical location of 26.835733 and 33.991857 and a corresponding accuracy measurement of thirteen meters. The application program can determine if the initial estimated location should be presented to a user of the mobile computing device or otherwise used by the application program based on this initial accuracy determination.

The application program can use the initial accuracy measurement to determine a number of times or a length of time that subsequent location measurements may be performed. The subsequent location measurements can be performed in order to determine a preferred location of the mobile computing device. The preferred location can be the location that is determined over a given time period to have the greatest accuracy (which could be the initial location). The preferred location can also be the average of two or more of the location estimates received over the time period, as another example. If the accuracy measurement of the initial location reading is high (e.g., the radial distance is smaller than a threshold value), the application program can request that the location-identifying software determine a stream of subsequent location estimates over a short period of time. Alternatively, if the accuracy measurement is low (e.g., the radial distance is larger than a threshold value), the location-identifying software can determine a stream of subsequent location estimates over a longer period of time. Determining a stream of subsequent location estimates over a shorter period of time may reduce the amount of power used by the mobile computing device, but may be less likely to identify a location estimate with high accuracy.

As described above, the application program can receive from the location-identifying software an initial estimated location. The initial estimated location can be the first estimated location received by the application program upon the application program being invoked on the mobile computing device. In some examples, the initial estimated location is determined in response to user-input requesting that an estimated location be determined. The application program can present the initial estimated location to the user if the initial location is associated with an accuracy that is above a threshold value. The display or use of the initial location estimate can occur subsequent to the initial location reading and before any subsequent readings, or during the subsequent location readings but before a final location reading during the time period. If the initial location estimate is determined to be below the threshold value, the application program may not display or otherwise use the initial location estimate while subsequent location readings are performed.

As described above, the mobile computing device can perform a stream of subsequent location determinations over the determined period of time (e.g., either a short or long period of time that depends on the accuracy of the initial location reading). If, upon expiration of the period of time, the application program determines that a subsequently determined location estimate is associated with an accuracy that is better than the initial location's accuracy value, the subsequent location estimate can be selected as a preferred location estimate and displayed on a user interface of the display device, or can be used by the application program. The preferred location estimate can replace a presentation of the initial location estimate on the user interface. Alternatively, when the initial location estimate is not presented on the user interface because the initial accuracy reading was poor, the application program can display the preferred location on the user interface after expiration of the time period, but not before expiration of the time period.

The application program can stop determining subsequent locations if a determined location is above an early termination threshold value. The early termination threshold value may correspond to a greater accuracy than the above described threshold accuracy, and may correspond to an accuracy that is determined to be particularly accurate, so that subsequent location determinations need not be performed.

FIG. 1 is an illustration of a mobile computing device 100 that uses wireless signals to determine an estimated location of the mobile computing device 100. The mobile computing device 100 can receive wireless signals from transmitters (also called beacons) in order to estimate (i) the location of the mobile computing device 100 and (ii) an accuracy measurement associated with the estimated location. Based on the accuracy measurement, the mobile computing device 100 can determine a number of subsequent location determinations to perform during a process of determining a single, preferred location to use for the mobile telephone. After all location determinations for the process have been performed, the mobile computing device 100 can determine a preferred location estimate and can send the preferred location estimate to an application program installed on the mobile computing device 100.

The mobile computing device 100 can be a cellular telephone, a laptop, a netbook, a tablet PC, or a navigation system, to name a few examples. The mobile computing device 100 can be attached to a vehicle. For example, the mobile computing device 100 can be a vehicle navigation system installed in the vehicle during manufacturing.

The mobile computing device 100 includes a location identification unit 102. The location identification unit 102 can receive signals from one or more transmitters 104a-b, such as GPS satellites. The location identification unit 102 can include hardware on the mobile computing device 100 configured to receive signals from the transmitters 104a-b. Software installed on the location identification unit 102 can determine an estimated location of the mobile computing device 100 based on the signals received from the transmitters 104a-b. For example, the location identification unit 102 can determine a length of time each of the signals took to travel from GPS satellites to the mobile computing device 100. The location identification unit 102 can determine an estimated location based on the lengths of time.

The estimated location can be the estimated latitude and longitude coordinates of the mobile computing device 100. In some implementations, the estimated location can be a venue (e.g., a business, a sports arena, etc.). For example, the location identification unit 102 can send estimated location information for the mobile computing device 100 to a server. The server can send an estimated venue that the mobile computing device 100 is likely to be at based on the estimated location information. For example, the location identification unit 102 can determine that the mobile computing device 100 is at John's Hot Dog Stand. In some implementations, the estimated location can be a street address or a street intersection.

The location identification unit 102 can determine an accuracy measurement of the estimated location. For example, the accuracy can be a representation of a size of a region that includes the estimated location, and within which an actual location of the mobile computing device is calculated to be found with a particular probability. For example, if the accuracy is high, an actual location of the mobile computing device 100 may be calculated with 95% probability to be within five feet of the estimated location. Alternatively, if the accuracy is low, an actual location of the mobile computing device 100 may be calculated with 95% probability to be within 500 feet of the estimated location. In some implementations, the accuracy measurement can include a radial distance and a probability that the mobile computing device 100 is located in a circle that is centered at the estimated location and has the radial distance.

In some implementations, the location identification unit 102 is configured to receive signals from cellular base station towers. For example, the transmitters 104a-b can be cellular base station towers. The location identification unit 102 can use the received signals in a cellular tower triangulation technique to determine an estimated location of the mobile telephone. In some examples, signals received from the cellular towers include portions of information that identify the broadcasting cellular tower (or an antenna at the tower). The location identification unit 102 may transmit the identifying portions of information to a server system and receive in response an estimated geographical location or geographical area of the mobile computing device. For example, the server system may provide information on the altitude of a transmitter and a direction the transmitter faces.

Continuing the example, the location identification unit 102 can determine an estimated location of the mobile computing device 100 based on the information received from the server. The location identification unit 102 can determine the strength of the signals sent by the transmitters 104a-b. In some implementations, the location identification unit 102 uses the signal strength in determining the estimated location. For example, the location identification unit 102 can receive signals from three cellular base stations, the home base station that the mobile computing device 100 is communicating a stream of voice or internet data traffic with and two neighboring base stations. The location identification unit 102 can use the stronger signal strength from the home base station and the lower signal strengths from the neighboring base stations to triangulate the estimated location of the mobile computing device 100.

In some implementations, the location identification unit 102 can use WiFi signals to determine an estimated location of the mobile computing device 100. For example, the location identification unit 102 can receive a WiFi signal from an 802.11n router and an identifier (e.g., a Media Access Control (MAC) address) of the router. The location identification unit 102 can query a server to determine the location of the router using the router identifier. Based on the router location and the strength of the WiFi signal, the location identification unit can determine an estimated location of the mobile computing device 100.

The location identification unit 102 can receive signals from Bluetooth, radio frequency identification (RFID), or ultra-wide band (UWB) transmitters. The location identification unit 102 can use signals received from the transmitters to determine an estimated location of the mobile computing device 100.

In some implementations, the location identification unit 102 can use a hybrid method to determine the estimated location of the mobile computing device 100. The hybrid method can use multiple different signal types to determine an estimated location. For example, the location identification unit 102 can use both GPS signals and cellular base station signals to determine an estimated location.

In some implementations, the location identification unit 102 receives signals from the transmitters 104a-b and sends signal information to a server. The server can use the signal information to determine an estimated location of the mobile computing device 100. For example, the location identification unit 102 can receive signals from four GPS satellites. The location identification unit 102 can send the signals and the times that the signals were received to the server and the server can use the information to determine an estimated location of the mobile computing device 100.

The mobile computing device 100 can include an application program 106. The application program 106 can request an estimated location of the mobile computing device 100 from the location identification unit 102. For example, the application program 106 can send a first location request R1 to the location identification unit 102. The location identification unit 102 can determine an initial location estimate and associated accuracy (possibly by performing multiple location determinations itself and averaging the determinations or selecting a most accurate) and send the initial location estimate L1 and an associated accuracy A1 to the application program.

The application program 106 can use the estimated location L1 or display the estimated location L1 on a display device 108 if the accuracy measurement A1 is above a threshold value. For example, the application program 106 can be a social networking program. The application program 106 can be used to display updates about a user of the mobile computing device 100 on a social networking site. The application program 106 can display a prompt on the display device 108 asking the user if the user is at the estimated location L1. For example, the display device 108 can present "Are you located by the intersection of Sixth Street and Hennepin?" to the user. If the user indicates that the estimated location is correct, the application program 106 can update a webpage with the current location of the user.

The display device 108 can be a liquid crystal display (LCD) included in the mobile computing device 100. The display device 108 can be a touch screen display. The mobile computing device 100 can include a trackball and a keyboard for receiving input from a user, such as a request for the current location of the mobile computing device 100.

Based on the accuracy A1 of the initial location estimate L1, the application program 106 can determine a time period TP, during which the application program 106 may request that the location identification unit 102 perform a stream of subsequent location estimate determinations. The application program 106 can send the time period TP with a second request R2 to the location identification unit 102. The location identification unit 102 can determine additional location estimates (e.g., L2, L3, L4, etc.) and accuracy measurements (e.g., A2, A3, A4, etc.) that are associated with the location estimates. For example, if the accuracy A1 is above a threshold value (e.g., the first location estimate L1 is determine to have an accuracy greater than 0.75 out of 1.0) the application program 106 can select a predetermined short time period for the time period TP. Similarly, if the accuracy A1 is below the threshold value, the application program 106 can select a predetermined long time period. In some implementations, a user of the mobile computing device 100 can specify the length of the short and long time periods.

In some implementations, the application program 106 can determine if an accuracy measurement is above an early termination threshold (e.g., the mobile computing device 100 is less than ten feet from the estimated location with a probability of ninety percent). The early termination threshold can be higher than the threshold value used to determine the short or long time periods. The application program 106 can use the location estimate associated with the accuracy measurement that is above the early termination threshold as a preferred location.

The location identification unit 102 may stop transmitting location estimates to the application program 106 after determining that an accuracy measurement is above the early termination threshold. The end of transmission may occur in response to a request by the application program 106 that the location identification unit 102 stop transmitting location estimates. In some implementations, the application program 106 receives one or more subsequent location estimates after determining that an accuracy measurement is above the early termination threshold. The application program 106 can determine that an accuracy measurement is above the early termination threshold immediately upon receiving the initial location estimate and an accuracy measurement (e.g., before requesting additional location estimates over the time period TP). Alternatively, the application program 106 can determine that an accuracy measurement is above the early termination threshold for the additional accuracy measurements.

In some implementations, the application program 106 uses a heuristic to determine a length of the time period TP. For example, the application program 106 can determine varying lengths for TP based on different initial accuracy measurements. Alternatively, two or more different accuracy measurements can be associated with the same time period. In some implementations, the application program 106 can query a table of dozens of accuracy measurements. The application program 106 can receive, in response, a duration that is mapped to the accuracy measurement and use the duration for the length of the time period TP.

In some implementations, the application program 106 determines a number of subsequent location estimates to be determined by the location identification unit 102. For example, the application program 106 can request six additional location estimates from the location identification unit 102. The request R2 can be sent to the location identification unit 102 and can include a request that six additional location estimates L2, L3, L4, L5, L6, and L7, be performed. Alternatively, the application program 106 can send six location requests after the initial location request R1 to the location identification unit 102. For example, the application program 106 can send the second location request R2 after receiving the first location estimate L1. Alternatively, request R2 can request that determinations be performed until a terminating request is provided (e.g., by the application program). After the application program 106 receives the second location estimate L2, the application program 106 can send a third location request R3 to the location identification unit 102. The requests may continue until the application program determines that they should cease, for example and as discussed above, in connection with a length of the time period TP.

The mobile computing device 100 can include a timer 110 for determining a length of the time period, a number of subsequent requests, or for determining the end of the time period. In some examples, the location identification unit 102 can receive the second location request R2 from the application program. The second location request R2 can include the time period TP during which the location identification unit 102 can send estimated locations to the application program 106. The location identification unit 102 can send the time period TP to the timer 110. When the time period TP ends, the timer 110 can send a message to the location identification unit 102 indicating the time period has passed. The location identification unit 102 can continuously receive signals from the transmitters 104a-b during the time period TP and send estimated locations and associated accuracy measurements to the application program 106 until the timer 110 indicates that the time period has expired.

In some implementations, the timer 110 can indicate when the location identification unit 102 can request signals from the transmitters 104a-b. For example, the second request R2 can indicate that the location identification unit 102 should receive the signals after every 0.01 second interval. The location identification unit 102 can send a request to the timer 110 for an indication of every 0.01 second time interval during the time period TP. The timer 110 can send a message to the location identification unit 102 after each 0.01 second time interval has passed until the end of the time period TP. The location identification unit 102 can determine and send an estimated location to the application program 106 after receiving each message.

The application program 106 can send the received location estimates and associated accuracies to a preferred location determination unit 112. The preferred location determination unit 112 can determine the location estimate with the highest accuracy and send the preferred location to the application program 106. In some implementations, the preferred location determination unit 112 can average two or more of the location estimates in order to determine the preferred location or otherwise perform a statistical analysis to identify a preferred location. The preferred location determination unit 112 can send the preferred location to the application program 106. In some implementations, the preferred location determination unit 112 is part of the application program 106.

In some implementations, the application program 106 can be integrated with the location identification unit 102. The application program 106 can transmit the preferred location to another resource or application program on the mobile computing device 100.

In some implementations, the application program 106 can send a message to people associated with the user, when the message indicates a location at which the user is located (e.g., the preferred location). For example, John can use the application program 106 to send messages to friends indicating where John is. John can select an option in the application program 106 to send his current location to his friends. The application program 106 can request John's estimated location from the location identification unit 102 using the scenarios described herein. The preferred location determination unit 112 can determine a preferred location from the estimated locations. The application program 106 can send the message "John is currently at Ike's Restaurant." to John's friends without displaying the preferred location to John.

In some implementations, the application program 106 can request favorite location information from a server. For example, the server can include information on locations that a user of the mobile computing device 100 often visits. The application program 106 can send the preferred location to the server. The server can determine if the preferred location is for one of the user's favorite locations, such as the user's house. The application program 106 can use favorite location information to personalize content, such as messages presented on the display device 108. For example, John can use the application program 106 to update a social networking webpage. The application program 106 can display an interface element providing a suggested location or venue at which John is located and requesting that John confirm whether or not he is at the suggested location. If John confirms the suggested location, the mobile telephone 100 may transmit a request to a server system to update a webpage with "John is at home."

In some implementations, the application program 106 can provide weather information to a user of the mobile computing device 100. The application program 106 can use favorite location information to determine if the preferred location is close to venues that the user often travels to. If the application program 106 determines that that the preferred location is not close to frequently visited venues, the application program 106 may determine that the user is on vacation. The application program 106 can display extended weather forecasts for the preferred location of the mobile computing device 100 based on the determination that the user may be on vacation. Alternatively, the application program 106 can display the weather for the current day if the user is close to frequently visited venues (e.g., home, work, a favorite restaurant, etc.).

The application program 106 can use or display the initial location estimate L1 if the initial accuracy measurement A1 is above a threshold value. For example, the mobile computing device 100 can be a navigation system in a car. The application program 106 can present a map on the display device 108. The application program 106 can request R1 an initial location estimate from the location identification unit 102. The application program 106 can determine the time period TP for the location identification unit 102 to determine subsequent estimated locations based on an accuracy measurement A1 of the initial location estimate L1. The location identification unit 102 can send additional location estimates (e.g., L2, L3, etc.) to the application program 106. The application program 106 can determine that the accuracy measurement A1 of the initial location estimate L1 is above a threshold value and display the initial location estimate L1 on the map, e.g., as an icon indicating the location of the car. The initial location estimate L1 can be displayed after the application program 106 receives two additional location estimates (e.g., L2 and L3) from the location identification unit 102 but before the time period TP has expired. In some implementations, the initial location L1 can be displayed before the application program 106 receives subsequent location estimates.

Continuing the example, after the time period TP has ended, the application program 106 can send two or more of the location estimates to the preferred location determination unit 112. The preferred location determination unit 112 can determine a preferred location of the car and send the preferred location to the application program 106. The application program 106 can update the display device 108 with the preferred location by moving the icon of the car on the map to the preferred location from the initial location. In some implementations, the initial location can be the same as the preferred location and the application program 106 may not need to update the display device 108.

In some implementations, the application program 106 determines that the initial accuracy measurement is below a threshold value. The application program 106 can determine the time period TP and wait for the location identification unit 102 to determine all of the subsequent location estimates. The application program 106 can send two or more of the location estimates to the preferred location determination unit 112 to receive a preferred location. The application program 106 can display the preferred location on the display device 108. Alternatively, the application program 106 can use the preferred location to identify the location of the mobile computing device 100 (e.g., by updating a blog with a determined preferred location L3, where the blog was not updated with the intermediate locations L2 and L4).

Figure 2:
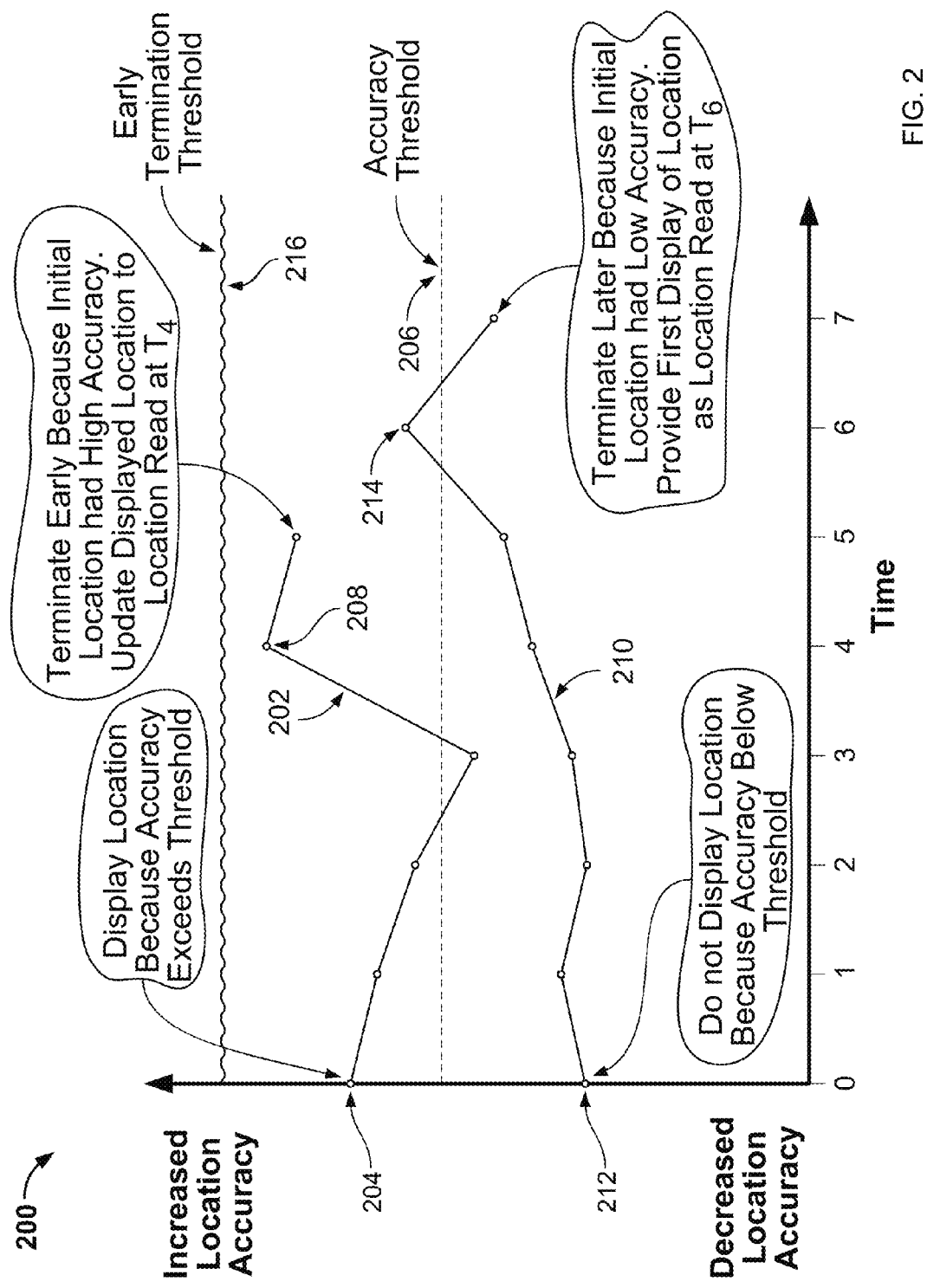
FIG. 2 is a graph of estimated accuracies for two different series of locations readings by a mobile computing device.

FIG. 2 is a graph of estimated accuracies for two different series of locations readings by a mobile computing device. Each line in graph 200 illustrates the accuracies of location estimates for a same mobile computing device 100 at different time periods (and likely in different locations). Each dot (e.g., dots 208 and 214) represent an accuracy for a location estimate. The location estimates, however, are not illustrated. The length of each line represents a length of time that location and accuracy estimates are performed by the mobile computing device. In particular, time 0 represents an initial location reading and the length of the lines represents a length of the time period TP for each line. The different time periods (TP) can be determined based on the accuracy measurement of the location estimates at time 0. In some implementations, the application program 106 can determine the time periods dynamically. For example, the time period can be adjusted based on the accuracy measurement of the most recent location estimate received by the application program 106.

The first line 202 represents location readings when a first accuracy estimate 204 is above an accuracy threshold 206. An application program on the first mobile computing device, e.g., the application program 106, can determine that the first accuracy estimate 204 is above the accuracy threshold 206 and request location estimates for a shorter time period (e.g., for five additional seconds). Because the first accuracy estimate 204 was above the threshold 206, the application program 106 can use or display a location that corresponds to the first accuracy estimate 204 before the shorter time period has expired. For example, the application program can display a location that corresponds to the high accuracy estimate 204 on a map at or before time T1.

After the application program receives all of the accuracy estimates on the first line 202 (e.g., after time T5) the application program determines a preferred location from the accuracies depicted on first line 202. For example, the application program can determine that the preferred location is associated with a fourth accuracy 208 that was taken at time T4. The application program can determine the preferred location by selecting the location estimate with the highest accuracy. The application program can use the preferred location, for example, by updating the location of the mobile computing device on the map.

The second line 210 represents location readings where a first accuracy estimate 212 is below a threshold 206. An application program on the second mobile computing device can determine that the low accuracy location estimate 212 is below the accuracy threshold 206. The application program can determine not to use the low accuracy location estimate 212 based on the low accuracy location estimate 212 being below the accuracy threshold 206. The application program can determine that the second line 210 should be longer than a length of the first line 202 based on the initial low accuracy estimate 212.

For example, the application program can select a longer time period for the second line 210 than the time period for the first line 202. In other implementations, the graph 200 can have multiple thresholds for determining the length of the lines (e.g., the time periods). For example, the lengths of the lines can vary based on the accuracy of the initial location estimate (e.g., the lines can have lengths of 1, 2, 3, 4, etc. based on multiple different accuracy thresholds).

After time T7, the application program can determine a preferred location from the locations corresponding to the accuracies on the second line 210. For example, the application program can determine that a sixth location estimate 214 is the preferred location. The application program can use the preferred location after receiving all of the location estimates. For example, the application program can update the status of a user of the second mobile device by indicating where the user is located.

In some implementations, when a location estimate has an accuracy above an early termination threshold 216, an application program can stop requesting location estimates from a location identification unit, e.g., the location identification unit 102. For example, the application program can determine that the mobile computing device is in a circle centered on the location estimate with a probability greater than the early termination threshold 216 (e.g., 15 meters). The application program can use the location estimate associated with the accuracy measurement that is above the early termination threshold 216 as the preferred location.

Figure 3:
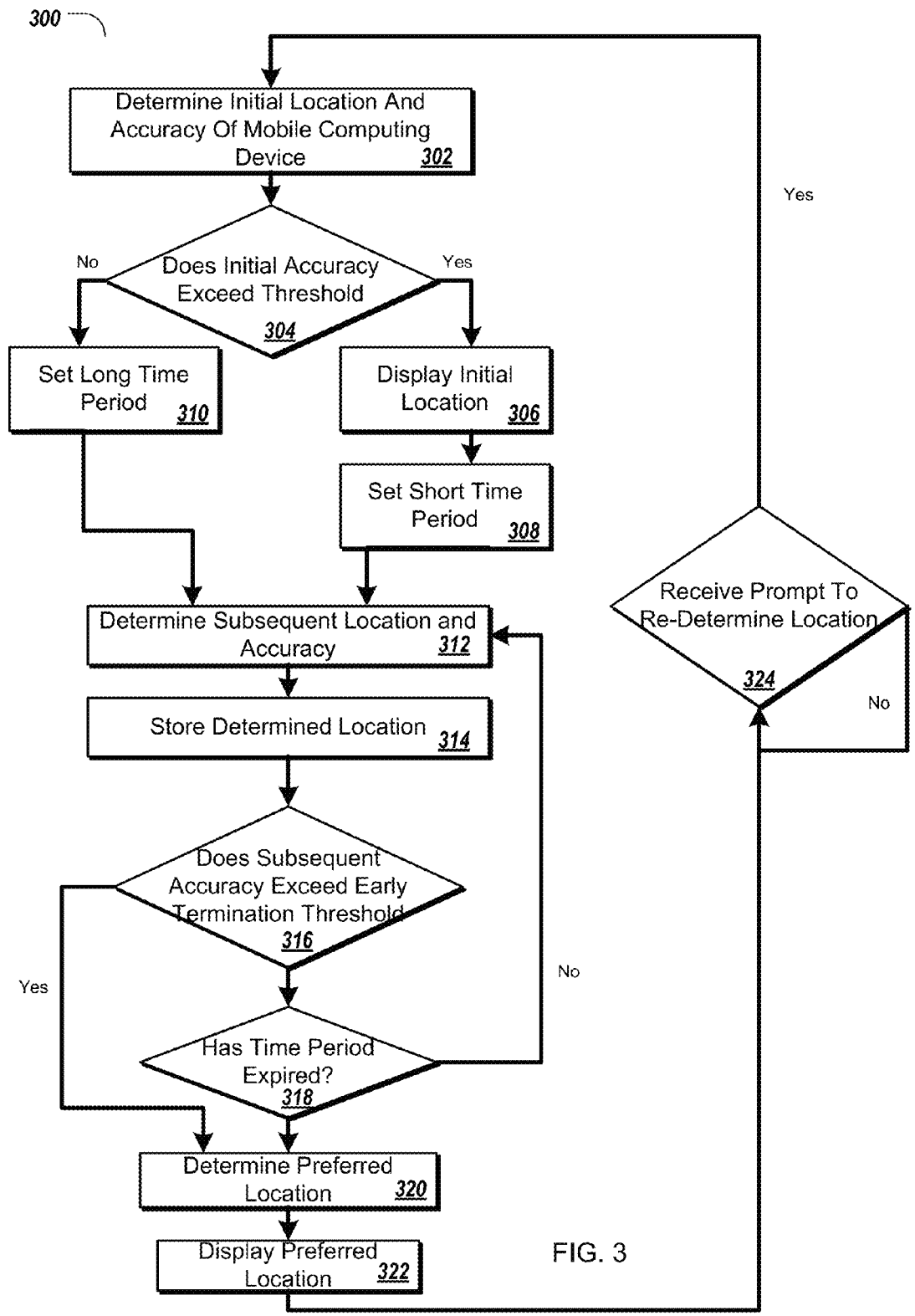
FIG. 3 is a flowchart of an example process for determining a preferred location of a mobile computing device.

FIG. 3 is a flowchart of an example process 300 for determining a preferred location of a mobile computing device. The process 300 can be performed, for example, by systems such as the system described in association with FIG. 1. The process 300 is described with reference to the mobile computing device 100, however, other systems can perform the process 300.

In box 302, an initial location and accuracy measurement of a mobile computing device is determined. For example, the location identification unit 102 can determine an initial location estimate of the mobile computing device 100. The location identification unit 102 can receive wireless signals from the transmitters 104a-b. The location identification unit 102 can use the wireless signals to determine the initial location. The location identification unit 102 can also determine an accuracy measurement of the initial location estimate. The location estimate can be the estimated latitude and longitude of the mobile computing device 100. Alternatively, the location estimate can be a street address or a venue that the mobile computing device 100 may be located at.

The accuracy measurement can be the probability that the mobile computing device is within a specific distance of the location estimate (e.g., a 70% probability that it is within 100 meters). Also, the accuracy measurement can include a radial distance, that when swept around the location estimate, creates a circle that is associated with a given probability of actual geographic location for the mobile computing device 100. For example, the mobile computing device can be located in a circle with the radial distance, where the center of the circle is the location estimate.

In box 304, a determination is performed to identify if the initial accuracy measurement exceeds a threshold value. For example, the application program 106 can determine if the initial accuracy measurement exceeds a threshold value of 50 meters (e.g., with a better accuracy of 20 meters). If the initial accuracy measurement is determined to exceed the threshold value, the operations of box 306 can be performed. If the initial accuracy measurement does not exceed the threshold value, the operations of box 310 can be performed.

In some implementations, the application program 106 can determine if the initial accuracy measurement exceeds an early termination threshold. For example, if the initial accuracy measurement exceeds the early termination threshold, the application program can use the initial location estimate as the preferred location.

In box 306, the initial location is displayed. For example, the application program 106 can display the initial location estimate on the display device 108 as the current location of the mobile computing device 100. Alternatively, the application program can use the initial location estimate, for example, by updating the status of the user internally or transmitting the initial location estimate to a server system for dissemination to other users and display of the initial location estimate on the other user devices.

The application program 106 can use the initial location estimate before subsequent location estimates are determined. Alternately, the application program 106 can use the initial location estimate after one or more subsequent location estimates have been determined. For example, the application program 106 can post the estimated location on a blog after three subsequent locations estimates have been determined. In some examples, the initial location estimate will not be displayed for a first time after a final subsequent location estimate is determined (unless the initial location estimate is selected as the preferred location estimate).

In box 308, a short time period is set. For example, the application program 106 can determine that subsequent location estimates may be determined by the location identification unit 102 for a short time period. In some implementations, the application program 106 determines that the location identification unit 102 can compute a small number of subsequent location estimates instead of the short time period. The short time period can be determined based on the initial accuracy measurement being high.

In box 310, a long time period is set. For example, the application program 106 can determine that subsequent location estimates may be determined by the location identification unit 102 for a long time period based on the initial accuracy measurement being low.

In some implementations, the threshold determines whether or not the initial location estimate is displayed (see box 306) because the choice to display or not display is binary, but the time period is determined algorithmically based an accuracy of the initial location reading. For example, the application program 106 can use the initial accuracy measurement as input to the equation and can receive a time period from the equation. More than two possible time periods may be received based on different initial accuracy levels.

In box 312, a subsequent location and accuracy of the mobile computing device are determined. For example, the location identification unit 102 can determine a second location estimate and a second accuracy measurement.

In box 314, the determined location is stored. For example, the location identification unit 102 can send the second location estimate and accuracy to the application program 106. The application program 106 can store the second determined location estimate and the second accuracy measurement in memory with the initial location estimate and accuracy. The memory can be permanent memory (e.g., a rotating hard disk) and not temporary memory such as a solid-state cache or RAM. Similarly, the application program 106 can store multiple subsequent location estimates and accuracies in memory.

In box 316, a determination is performed to identify if the subsequent accuracy measurement exceeds an early termination threshold. For example, the application program 106 can compare the second accuracy measurement with the early termination threshold. The application program 106 can stop receiving subsequent location estimates if the second accuracy measurement exceeds the early termination threshold and the operations of box 320 can be performed. If the subsequent accuracy measurement does not exceed the early termination threshold, the operations of box 318 can be performed.

In box 318, a determination is performed to identify if the time period has expired. For example, the application program 106 can determine if the time period for computing location estimates has expired. In some implementations, the location identification unit 102 can determine if the time period has expired.

If the application program 106 determines that the time period has not expired, the application program 106 can request subsequent locations from the location identification unit 102 and the operations of box 312 can be performed.

The application program 106 can send a request to the location identification unit 102 upon expiration of the time period. The request can include information instructing the location identification unit 102 to stop determining location estimates and accuracy measurements. In some implementations, if the location identification unit 102 determines that the time period has not expired, the location identification unit 102 can determine subsequent location estimates and accuracies and the operations of box 312 can be performed. If a determination is made that the time period has expired or all of the location estimates have been made, the operations of box 320 can be performed.

In box 320, a preferred location is determined. For example, the application program 106 or the preferred location determination unit 112 can determine the preferred location. The preferred location can be a location estimate with the highest accuracy measurement. Alternatively, the preferred location can be a combination of two or more of the location estimates.

The application program 106 can display the preferred location. For example, the application program 106 can update the current location of the mobile computing device 100 when the initial location was previously displayed on a map.

In some implementations, the application program 106 can post the initial location of the mobile computing device 100 to a blog. If the application program 106 determines that the preferred location is substantially different from the initial location, the application program 106 can update the blog with the preferred location.

In box 324, a determination is performed to identify if a prompt is received to re-determine the location. For example, the application program 106 can display a prompt for re-determining the location of the mobile computing device 100. The application program 106 can receive input from a user of the mobile computing device 100 to re-determine the location. If the application program 106 receives indication to re-determine the location of the mobile computing device 100, the operations of box 302 can be performed.

In some implementations, the application program 106 can receive input from a keyboard, a mouse, or a track ball indicating that the location of the mobile computing device 100 should be re-determined. In some implementations, a resource or application program on the mobile computing device 100 can request the location from the application program 106. The request may occur over a time period that is significantly greater than a time period between subsequent location determinations. For example, a location of the mobile computing device may be determined using process 300 every 30 seconds (where a single iteration of the process may take between, for example, 1 and 8 seconds depending on the determined time period). In some implementations, launching or opening the application program 106 indicates that the location of the mobile computing device 100 should be re-determined. In some implementations, the application program 106 can automatically re-determine the location after a predetermined period of time (e.g., every ten minutes). In some implementations, the process 300 is performed to determine a preferred location when the mobile computing device is awoken from a "sleep" state, a "hibernating" state, or a state where the screen was turned off.

Figure 4:
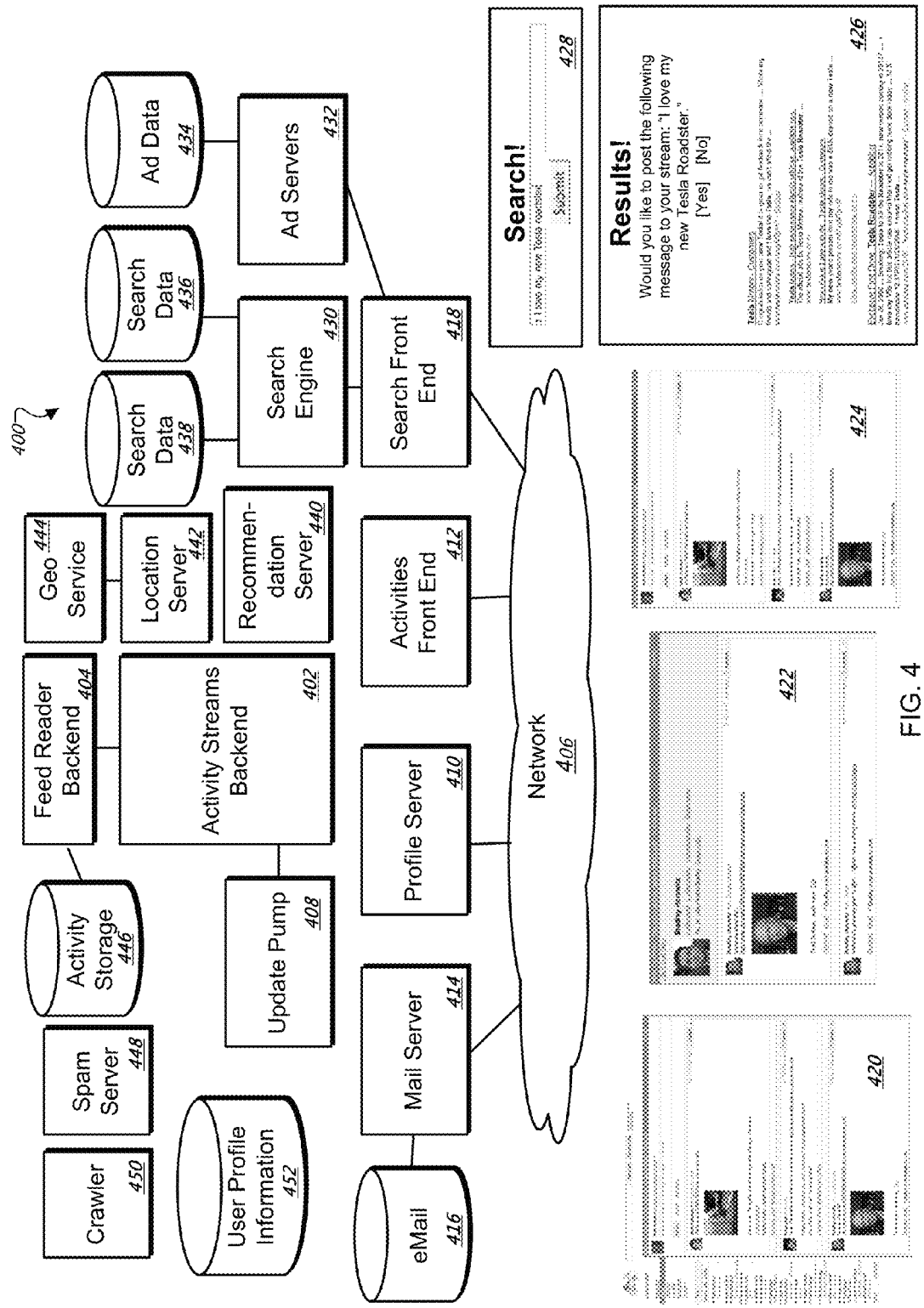
FIG. 4 is a schematic diagram of a system within which the various features described in this document may be implemented.

FIG. 4 is a schematic diagram of a system 400 within which the various features described in this document may be implemented. In general, the system 400 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application.

Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 400 by an activity streams backend 402, which is in charge of implementing business logic that defines the manner in which various submissions to the system 400 will be handled. The activity streams are characterized by activities, which are the subjects of posts (e.g., micro-blog posts) that users submit to the system 400, and various comments directed toward those activities. For example, a user may post an activity regarding a web page they are currently viewing by pasting a URL of the page into a posting page. Such action may cause the system 400 to gather important information form the URL, including images displayed on the page, headings, labels for images, or topical terms that describe a topic of the page (e.g., as previously determined by analysis of the words on the page, such as using ADSENSE analysis of the page). The system 400 may also obtain location information, such as the current location of the user, and/or a venue with which the user is most currently associated (e.g., that the user checked into recently or identified as a venue in which the user is located).

The activity streams back-end 402 also implements logic for determining what users are to receive posts, comments on posts, and other portions of streams in the system 400. In particular, users who have subscribed to receive posts form other users may be provided with posts when they log into the system 400, users may nominate other users to receive copies of streams when those other users would not ordinarily be included in the streams (e.g., by typing in identifiers for those other users when reviewing a post), and users may send streams directly to each other, among other things.

The feed reader back end 404 manages storage of posts and related data for the system 400. The feed reader back end 404 may rely on various levels of activity storage 446 to store posts, comments, on posts, and other information needed to construct streams for users when they request information from system 400. As with the other components shown in this figure, the feed reader back end 404, though shown as a single block, can be implemented using a number of different servers or server sub-systems Likewise, the activity storage 446 can be implemented across a number of databases and database types, and across a variety of servers and server sub-systems.

When posts or other updates are received by the activity stream back-end 402, they are formatted and provided to update pump 408. The update pump 408 is responsible for provided notices about newly-posted information to various services that may need such information. It acts, in effect, as a router and distributor of information relating to the system 400. For example, a mail server 414 may include functionality for integrating the display of streams, and may thus need to know about new posts so that users of a mail client can be shown immediately when new information is posted. In a similar manner, a search engine 430 may provide search results to users that include real-time updating information from various posts that users are supplying to the system, and can receive such updated information by interacting with the update pump 408 via understood APIs and remote procedure calls (RPCs) where the two components are sub-components of a larger organization-wide system.

Various web front-ends are provided to permit the system 400 communicate over a network 406, such as the internet (and adjacent supporting networks). For example, the mail server 414 may provide typical web-based electronic mail functionality, though with the integration of posts and comments intousers' in boxes, via a mail client 420. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 420, and a user may choose one in order to post a comment to be added to a stream, without having to leave the context of the message within the email client 420.

A profile server 410 generates code for representing user profiles such as profile 422 of user Joe Blow. The profile page may take the form of a standard feed page from a social networking site, arranged with a list of posts and comments from other users in reverse chronological order. In a similar manner, an activities front end 412 can generate a similar feed for a user's feed page 424, here for a user named Susie User. The profile page 422 and the feed page 424 may be very similar to each other, and can present content similar to that presented as part of a posting or micro-blogging section of mail client 420. In one example, the profile page 422 is what third parties see when they look at the user's account, while the feed page 424 is what the user himself or herself sees.

A search engine 430 and associated search front end 418 may provide a different sort of functionality for the system 400. Specifically, the search front end 418 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 428)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 426 may be generated that contains actual search results for the submitted query (whether with or without the preceding "z") generated by the search engine 430 using data from index 438 in a conventional manner, and may be displayed below an area that shows the user the form of a proposed post and selectable controls by which the user can edit the post and can then confirm an intent to post the information to friends, followers, or others. The post may then be forwarded by the search front end 418 to the activity streams backend 402, along with identifying information for the user (e.g., a user ID identified from a cookie on the user's computing device when the user is logged onto a broader service that implements the system 400).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in that communication mode, either without or without first presenting the proposed action to the user and confirm that the user intends such a communication to occur. For example, if a user types "z blog I'm having a great time," the syntax may indicate to the system 400 that the user would like to post the submitted phrase "I'm having a good time" to the user's blog (where the identity of the blog may be determined by the system 400 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 418, or the other front ends 410, 412, 414 to users of the system 400 and may be targeted using techniques like those employed in GOOGLE ADWORDS OR ADSENSE. Such serving of advertisements may depend on ad data in database 434, which may include information about advertisers, the text and other content for the advertisements, bid prices submitted by the various advertisers, and other relevant information needed to serves advertisements that are directed to users and/or streams of information directed from or to the users.

Various location-based services may be integrated with posts on comments, such as by identifying the locations (e.g., lat/long coordinates) or venues (e.g., stores, arenas, bars, or restaurants) from which posts or comments are made. Such services are provided in this example system 400 by a location server 442 and geo service 444. The location server 442 generally provides information about venues or other landmarks in response to receiving location information about a user of system 400. For example, when a user submits a post, geo-coordinates for the user may be provided with the post (e.g., via GPS functionality on the user's mobile computing device) or may be determined for the user by the system 400 (e.g., via cell tower or access point identification or triangulation). The geo-location information may be an estimated latitude and longitude of the mobile computing device and information identifying an accuracy of the estimation. The location server 442 may be made available through an API to various other components of the system 400.

The location server 442 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 400, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 400) and other similar information.

The location server 442 may obtain information that it needs to provide such functionality from various external services, such as geo service 444. Geo service 444 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 400. For example, a crawler 450 may crawl various posts and comments for the purpose of indexing the content in the system 400, so that, for example, search engine 430 may readily deliver search results that include the latest postings by users to the system 400. Also, spam server 448 may communicate with the activity streams backend 402 and/or the update pump 408 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 400 or making the content hidden).

Finally, a recommendation server 440 may be provided with any new activity or post that is submitted to the system 400 (e.g., via the activity streams back-end 402). The recommendation server 440 may write back to the activity streams backend 402 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 440 in order to maintain an adequate level of recommendations (not too many and not too few).

Using the components described here, then, the system 400 may provided for integration of various modes of posting and receiving content that is provided in streams, such as microblog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 400 may provide a communication facility that allows a user simpler and more complete interaction with friends and with other users, and may increase the level of knowledge that is made available to the users of the system 400.

Figure 5:
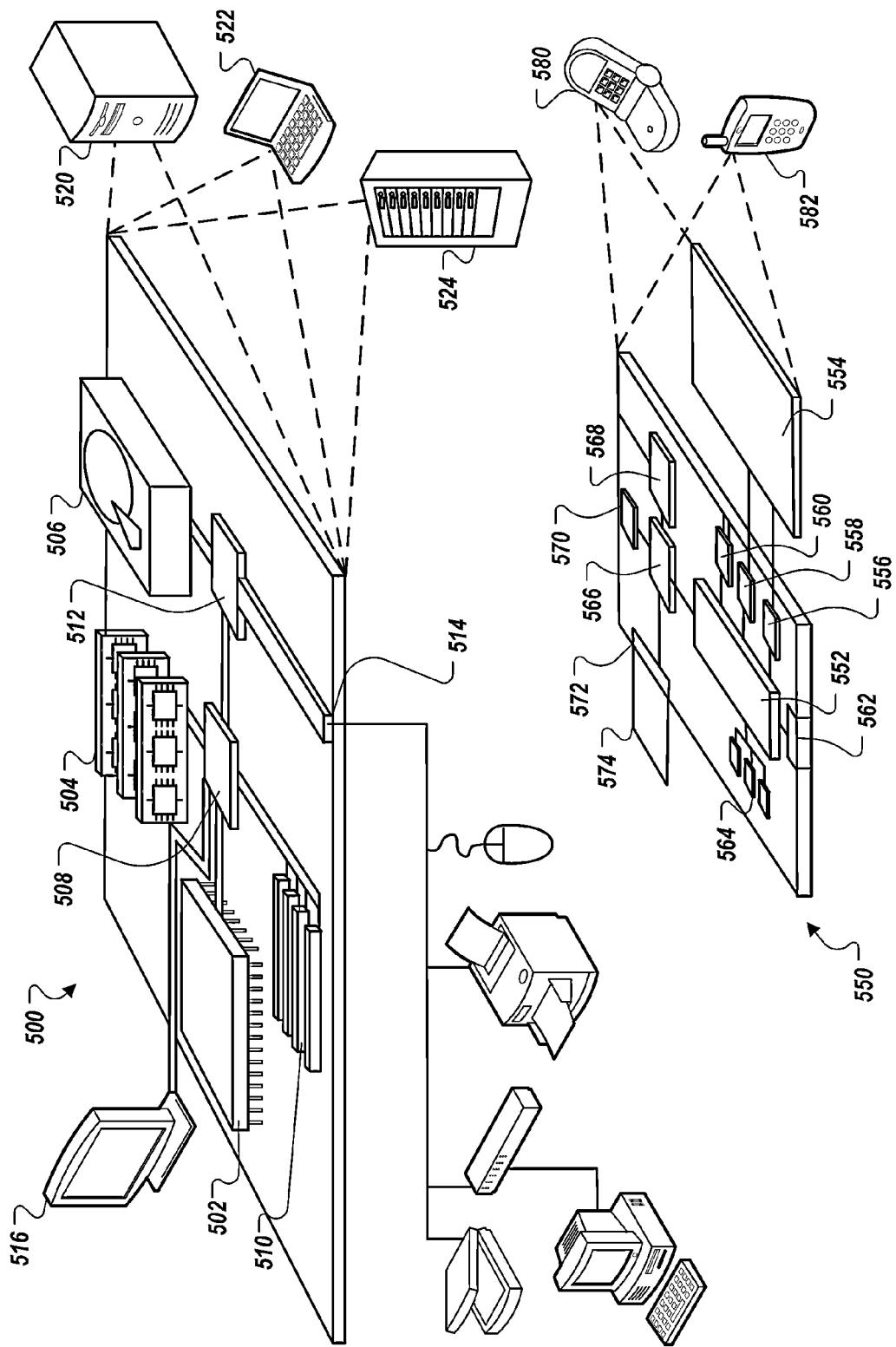
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other application programs. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, application programs run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store application programs or other information for device 550. Specifically, expansion memory 574 may included instructions to carry out or supplement the processes described above, and may include secure information also. Thus, for example, expansion memory 574 may be provide as a security module for device 550, and may be programmed with instructions that permit secure use of device 550. In addition, secure application programs may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by application programs running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by application programs operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application program specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software application programs or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application program server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for managing location-identification services may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for providing weather information on a mobile computing device, the method comprising:
   determining, at the mobile computing device and based on wireless signals received from one or more beacons, a preferred location estimate of a user of the mobile computing device;
   determining, whether the user is on vacation based on a comparison of the preferred location estimate to one or more favorite locations of the user;
   displaying, on the mobile computing device, an extended weather forecast at the preferred location estimate if the user is on vacation; and
   displaying, on the mobile computing device, the current weather if the user is not on vacation.

2. The method of claim 1, wherein the one or more beacons includes one or more satellites of a space-based location identification system.

3. The method of claim 1, wherein the one or more favorite locations comprise at least one of: the user's home, the user's work, or a restaurant.

4. The method of claim 1, comprising obtaining the one or more favorite locations from a server.

5. The method of claim 1, wherein determining whether the user is on vacation comprises determining that the user is on vacation if the preferred location estimate is close to the one or more favorite locations of the user.

6. The method of claim 1, wherein determining whether the user is on vacation comprises determining that the user is not on vacation if the preferred location estimate is not close to the one or more favorite locations of the user.

7. The method of claim 1, wherein determining a preferred location estimate comprises:
   determining a first location estimate of the mobile computing device and an accuracy of the first location estimate;
      determining a time period based on the accuracy of the first location estimate, wherein the time period is a long time period if the accuracy of the first location estimate is below a threshold accuracy value, the time period is a short time period if the accuracy of the first location estimate is above the threshold accuracy value;
      determining one or more subsequent location estimates of the mobile computing device and respective accuracies during the time period; and
      determining the preferred location from the first location estimate and the one or more subsequent location estimates.

8. A computer program product, stored on a non-transitory tangible computer-readable storage medium, for identifying a location of a mobile computing device, the product comprising computer program instructions operable to cause a processor of the mobile computing device to perform operations comprising:
   determining, at the mobile computing device and based on wireless signals received from one or more beacons, a preferred location estimate of a user of the mobile computing device;
   determining, whether the user is on vacation based on a comparison of the preferred location estimate to one or more favorite locations of the user;
   displaying, on the mobile computing device, an extended weather forecast at the preferred location estimate if the user is on vacation; and
   displaying, on the mobile computing device, the current weather if the user is not on vacation.

9. The computer program product of claim 8, wherein the one or more beacons includes one or more satellites of a space-based location identification system.

10. The computer program product of claim 8, wherein the one or more favorite locations comprise at least one of: the user's home, the user's work, or a restaurant.

11. The computer program product of claim 8, the computer program product further comprising computer program instructions operable to cause a processor to perform operations comprising: obtaining the one or more favorite locations from a server.

12. The computer program product of claim 8, wherein determining whether the user is on vacation comprises determining that the user is on vacation if the preferred location estimate is close to the one or more favorite locations of the user.

13. The computer program product of claim 8, wherein determining whether the user is on vacation comprises determining that the user is not on vacation if the preferred location estimate is not close to the one or more favorite locations of the user.

14. The computer program product of claim 8, wherein determining a preferred location estimate comprises:
   determining a first location estimate of the mobile computing device and an accuracy of the first location estimate;
      determining a time period based on the accuracy of the first location estimate, wherein the time period is a long time period if the accuracy of the first location estimate is below a threshold accuracy value, the time period is a short time period if the accuracy of the first location estimate is above the threshold accuracy value;
   determining one or more subsequent location estimates of the mobile computing device and respective accuracies during the time period; and
   determining the preferred location from the first location estimate and the one or more subsequent location estimates.

15. A mobile computing device comprising:
   a display device;
   a non-transitory tangible computer-readable storage medium having a computer program product stored thereon for identifying a location of the mobile computing device, the product comprising computer program instructions operable to cause a processor of the mobile computing device to perform operations comprising:
      determining, at the mobile computing device and based on wireless signals received from one or more beacons, a preferred location estimate of a user of the mobile computing device;
      determining, whether the user is on vacation based on a comparison of the preferred location estimate to one or more favorite locations of the user;
      displaying, via the display device, an extended weather forecast at the preferred location estimate if the user is on vacation; and
      displaying, via the display device, the current weather if the user is not on vacation.

16. The mobile computing device of claim 15, wherein the one or more beacons includes one or more satellites of a space-based location identification system.

17. The mobile computing device of claim 15, wherein the one or more favorite locations comprise at least one of: the user's home, the user's work, or a restaurant.

18. The mobile computing device of claim 15, the computer program product further comprising computer program instructions operable to cause a processor to perform operations comprising: obtaining the one or more favorite locations from a server.

19. The mobile computing device of claim 15, wherein determining whether the user is on vacation comprises determining that the user is on vacation if the preferred location estimate is close to the one or more favorite locations of the user.

20. The mobile computing device of claim 15, wherein determining whether the user is on vacation comprises determining that the user is not on vacation if the preferred location estimate is not close to the one or more favorite locations of the user.

21. The mobile computing device of claim 15, wherein determining a preferred location estimate comprises:
- determining a first location estimate of the mobile computing device and an accuracy of the first location estimate;
- determining a time period based on the accuracy of the first location estimate, wherein the time period is a long time period if the accuracy of the first location estimate is below a threshold accuracy value, the time period is a short time period if the accuracy of the first location estimate is above the threshold accuracy value;
- determining one or more subsequent location estimates of the mobile computing device and respective accuracies during the time period; and
- determining the preferred location from the first location estimate and the one or more subsequent location estimates.

\* \* \* \* \*